US011046009B2

United States Patent
Tsoutsos et al.

(10) Patent No.: US 11,046,009 B2
(45) Date of Patent: Jun. 29, 2021

(54) SYSTEM AND METHOD FOR MALWARE DETECTION IN ADDITIVE MANUFACTURED PARTS

(71) Applicant: NEW YORK UNIVERSITY, New York, NY (US)

(72) Inventors: Nektarios Georgios Tsoutsos, Athens (GR); Nikhil Gupta, Ossining, NY (US); Michail Maniatakos, Abu Dhabi (AE)

(73) Assignee: NEW YORK UNIVERSITY, New York, NY (US)

( * ) Notice: Subject to any disclaimer, the term of this patent is extended or adjusted under 35 U.S.C. 154(b) by 43 days.

(21) Appl. No.: 16/295,171

(22) Filed: Mar. 7, 2019

(65) Prior Publication Data

US 2019/0275744 A1 Sep. 12, 2019

Related U.S. Application Data

(60) Provisional application No. 62/639,548, filed on Mar. 7, 2018.

(51) Int. Cl.
 *B29C 64/393* (2017.01)
 *B33Y 50/02* (2015.01)
 (Continued)

(52) U.S. Cl.
 CPC ............ *B29C 64/393* (2017.08); *B33Y 50/02* (2014.12); *G05B 19/4099* (2013.01); *G05B 2219/49023* (2013.01); *G06F 17/13* (2013.01)

(58) Field of Classification Search
 CPC ..... B29C 64/393; B29C 64/386; B33Y 50/02; B33Y 50/00; G05B 19/4099; G05B 2219/49023; G06F 17/13
 See application file for complete search history.

(56) References Cited

U.S. PATENT DOCUMENTS 8,175,734 B2 * 5/2012 Fogel ................... B33Y 50/00
 700/98
9,636,872 B2 * 5/2017 Batchelder ............ B33Y 10/00
 (Continued)

OTHER PUBLICATIONS

C. Geuzaine and J.-F. Remacle. Gmsh: A 3-D finite element mesh generator with built-in pre- and post-processing facilities. International Journal for Numerical Methods in Engineering, 79(11):1309-1331, 2009.

(Continued)

*Primary Examiner* — Charles R Kasenge
(74) *Attorney, Agent, or Firm* — Riverside Law LLP

(57) ABSTRACT

A system for detecting corruption in a three-dimensional model for use in additive manufacturing comprises a non-transitory computer-readable medium with instructions stored thereon, that when executed by a processor, perform the steps of obtaining a set of tool-control language instructions that define an additive manufactured part, obtaining a first mechanical specification for the additive manufactured part, constructing a virtual three dimensional model from the set of tool-control language instructions, performing at least one analysis step on the virtual three dimensional model to determine whether the virtual three dimensional model meets the first mechanical, electrical, thermal, and/or magnetic specification, and indicating that the set of tool-control language instructions is corrupt when the virtual three dimensional model fails to meet the first mechanical, electrical, thermal, and/or magnetic specification. A method of producing an additive manufactured part is also described.

11 Claims, 10 Drawing Sheets

(51) Int. Cl.
    *G05B 19/4099* (2006.01)
    *G06F 17/13* (2006.01)

(56) References Cited

U.S. PATENT DOCUMENTS

| | | | |
|---|---|---|---|
| 10,556,382 B2* | 2/2020 | Bheda | B29C 64/386 |
| 2003/0058259 A1* | 3/2003 | Kawaguchi | G06F 30/15 |
| | | | 345/646 |
| 2011/0087350 A1* | 4/2011 | Fogel | G06T 19/00 |
| | | | 700/98 |
| 2011/0137578 A1* | 6/2011 | Dietrich | B29C 64/40 |
| | | | 702/43 |
| 2014/0039847 A1* | 2/2014 | Georgescu | G06F 30/15 |
| | | | 703/1 |
| 2014/0379308 A1* | 12/2014 | Georgescu | G06F 30/23 |
| | | | 703/1 |
| 2015/0148930 A1* | 5/2015 | Kumar | G05B 19/4099 |
| | | | 700/98 |
| 2016/0346997 A1* | 12/2016 | Lewis | B29C 67/0055 |
| 2018/0046168 A1* | 2/2018 | Kumar | G05B 19/4099 |
| 2018/0094953 A1* | 4/2018 | Colson | G06Q 10/0833 |
| 2018/0096175 A1* | 4/2018 | Schmeling | B29C 64/10 |
| 2018/0147783 A1* | 5/2018 | Bheda | B33Y 50/02 |

OTHER PUBLICATIONS

D. H. Laidlaw, W. B. Trumbore, and J. F. Hughes. Constructive solid geometry for polyhedral objects. In ACM SIGGRAPH computer graphics, vol. 20, pp. 161-170. ACM, 1986.

S. E. Zeltmann, N. Gupta, N. G. Tsoutsos, M. Maniatakos, J. Rajendran, and R. Karri. Manufacturing and security challenges in 3D printing. JOM, pp. 1-10, May 2016.

B. Berman. 3-D printing: The new industrial revolution. Business horizons, 55(2):155-162, 2012.

S. H. Huang, P. Liu, A. Mokasdar, and L. Hou. Additive manufacturing and its societal impact: a literature review. The International Journal of Advanced Manufacturing Technology, 67(5-8):1191-1203, 2013.

N. Guo and M. C. Leu. Additive manufacturing: technology, applications and research needs. Frontiers of Mechanical Engineering, 8(3):215-243, 2013.

Mao et al, The emerging frontiers and applications of high-resolution 3d printing. Micromachines, 2017, 8(4), 20 pages.

Cumpston et al., Two-photon polymerization initiators for three-dimensional optical data storage and microfabrication. Nature, 1999, 398(6722), 5 pages.

* cited by examiner

```
module c_arc(x_cnt, y_cnt, rad, d_end, c_sz, dir)
{
    d_step = 2 * asin(c_sz / (2 * (rad + c_sz / 2)));
    for (d = [360 * dir : d_step * (1 - 2 * dir) : d_end])
    {
        translate([x_cnt + rad * cos(d),
                   y_cnt + rad * sin(d), 0])
        rotate([0, 0, d])
        cube(c_sz, center=true);
    }
    translate([x_cnt + rad * cos(d_end),
               y_cnt + rad * sin(d_end), 0])
    rotate([0, 0, d_end])
    cube(c_sz, center=true);
}
```

Fig. 6A

```
module c_line(x0, y0, z0, x, y, z, c_sz)
{
    hull()
    {
        translate([x0, y0, z0])
            cube(c_sz, center=true);
        translate([x, y, z])
            cube(c_sz, center=true);
    }
}
```

Fig. 6B

SYSTEM AND METHOD FOR MALWARE DETECTION IN ADDITIVE MANUFACTURED PARTS

CROSS-REFERENCE TO RELATED APPLICATIONS

This application claims priority to U.S. provisional patent application No. 62/639,548, filed on Mar. 7, 2018, incorporated herein by reference in its entirety.

BACKGROUND OF THE INVENTION

Additive manufacturing (AM) is one of the fastest growth sectors in R&D and industrial manufacturing, and the trend is expected to continue in the near future. Among the most common forms of additive manufacturing are the various techniques that fall under the umbrella of "3D Printing", including but not limited to stereolithography (SLA), digital light processing (DLP), fused filament fabrication (FFF), fused deposition modelling (FDM), selective laser sintering (SLS), selective laser melting (SLM), electronic beam melting (EBM), digital manufacturing and laminated object manufacturing (LOM). These methods variously "build" a three-dimensional physical model, one layer at a time, providing significant efficiencies in rapid prototyping and small-batch manufacturing. AM also makes possible the manufacture of parts with features that conventional subtractive manufacturing techniques (for example CNC milling) are unable to create, such as internal channels or internal hollow spaces.

As 3D printing becomes more ubiquitous, traditional centralized process chains are transformed to a distributed manufacturing model, where each step of the process can be outsourced to different parties. Despite the countless benefits of this revolutionary technology, outsourcing parts of the process to potentially untrusted parties raises security concerns, as malicious design modifications can impact the structural integrity of the manufactured 3D geometries. Parts manufactured by conventional processes have their repeated integrity guaranteed by tooling or molds in some cases. Similarly, subtractive manufacturing techniques are incapable of generating hidden voids within three dimensional parts, that could lead to structural problems invisible to even the most precise surface analysis.

Thus, there is a need in the art for a system and method for securing products made using AM processes in order to detect structural defects that might result from corrupted or compromised 3D models or tool-control files. The present invention satisfies this need.

SUMMARY OF THE INVENTION

In one aspect, a system for detecting corruption in a three-dimensional model for use in additive manufacturing comprises a non-transitory computer-readable medium with instructions stored thereon, that when executed by a processor, perform the steps of obtaining a set of tool-control language instructions that define an additive manufactured part, obtaining a first mechanical specification for the additive manufactured part, constructing a virtual three dimensional model from the set of tool-control language instructions, performing at least one analysis step on the virtual three dimensional model to determine whether the virtual three dimensional model meets the first mechanical specification, and indicating that the set of tool-control language instructions is corrupt when the virtual three dimensional model fails to meet the first mechanical specification.

In one embodiment, the set of tool-control language instructions comprise g-code statements or instructions. In one embodiment, the set of tool-control language instructions comprise m-code statements or instructions. In one embodiment, the set of tool-control language instructions comprise step-nc statements or instructions. In one embodiment, the analysis step is compatible with a numerical method for solving partial differential equations. In one embodiment, the numerical method is a finite element analysis. In one embodiment, the numerical method is a computational fluid dynamics analysis. In one embodiment, the numerical method is an extended discrete element method analysis. In one embodiment, the analysis step comprises a tensile test. In one embodiment, the analysis step comprises a thermal conductivity test.

In one embodiment, the virtual three dimensional model is constructed by combining a set of basic solid shapes. In one embodiment, each basic solid shape has a set of dimensions based on a first additive manufacturing material used in production of the additive manufactured part. In one embodiment, the dimensions of each basic solid shape vary according to a nozzle temperature defined in the set of tool-control language instructions. In one embodiment, the dimensions of each basic solid shape vary according to a material flow rate defined in the set of tool-control language instructions. In one embodiment, the dimensions and cross section of each basic solid shape vary according to a set of coordinates and a printing speed defined in the set of tool-control language instructions. In one embodiment, the instructions further comprise the step of checking the virtual three dimensional model for unexpected voids having a size greater than a void size threshold. In one embodiment, the instructions further comprise the step of checking the virtual three dimensional model for unexpected protrusions having a size greater than a protrusion size threshold.

In another aspect, a method of producing an additive manufactured part comprises the steps of obtaining a set of tool-control language instructions that define the additive manufactured part, obtaining a first mechanical specification for the additive manufactured part, constructing a virtual three dimensional model from the set of tool-control language instructions, performing at least one analysis step on the virtual three dimensional model to determine whether the virtual three dimensional model meets the first mechanical specification, and printing an additive manufactured part from the set of tool-control language instructions when the virtual three dimensional model meets the first mechanical specification. In one embodiment, the set of tool-control language instructions comprises g-code statements or instructions. In one embodiment, the set of tool-control language instructions comprises m-code statements or instructions. In one embodiment, the set of tool-control language instructions comprises step-nc statements or instructions. In one embodiment, the at least one analysis step is compatible with a numerical method for solving partial differential equations. In one embodiment, the numerical method is a finite element analysis. In one embodiment, the numerical method is a computational fluid dynamics analysis. In one embodiment, the numerical method is an extended discrete element method analysis.

In one embodiment, the additive manufactured part is printed from a polymer. In one embodiment, the additive manufactured part is printed from a metal. In one embodiment, the additive manufactured part is printed from a ceramic. In one embodiment, the additive manufactured part is printed from a composite material. In one embodiment, the step of constructing the virtual three dimensional model from the set of tool-control language instructions comprises the steps of generating a set of basic solid shapes, compiling geometric transformations on a set of basic solid shapes into transformed solid shapes, compiling a union of a first subset of basic solid shapes into a first compound solid shape, compiling an intersection of a second subset of basic solid shapes into a second compound solid shape, compiling a difference of a subset of basic solid shapes into a third compound solid shape, compiling a union of a fourth subset of basic solid shapes into at least one solid geometry, compiling a union of a subset of compound solid shapes into at least one solid geometry, converting the at least one solid geometry into a three dimensional mesh, and creating a virtual three dimensional model from the three dimensional mesh.

In one embodiment, the method further comprises the steps of compiling a set of geometric transformations on a set of basic solid shapes into a set of transformed solid shapes, compiling a union of a first subset of transformed solid shapes into a first compound solid shape, compiling an intersection of a second subset of transformed solid shapes into a second compound solid shape, compiling a difference of a third subset of transformed solid shapes into a third compound solid shape, and compiling a union of a subset of transformed solid shapes into at least one solid geometry. In one embodiment, the basic solid shapes are prisms. In one embodiment, the basic solid shapes are cylinders. In one embodiment, the basic solid shapes are cuboids. In one embodiment, the basic solid shapes are pyramids. In one embodiment, the basic solid shapes are spheres. In one embodiment, the basic solid shapes are cones.

In one embodiment, the method further comprises the steps of assigning a first material value to a basic solid shape when a sintering laser is enabled, and assigning a second material value to the basic solid shape when the sintering laser is disabled. In one embodiment, the method further comprises the steps of assigning a first material value to a basic solid shape when a fused material extruder is enabled, and assigning a second material value to the basic solid shape when the fused material extruder is disabled. In one embodiment, the method further comprises the steps of assigning a first material value to a basic solid shape if a nozzle temperature setting exceeds a threshold, and assigning a second material value to a basic solid shape when the nozzle temperature setting is below the threshold. In one embodiment, the method further comprises the steps of assigning at least one material stiffness parameter based on an intended composition of the additive manufactured part, and assigning at least one displacement value based on an intended functionality of the additive manufactured part. In one embodiment, the method further comprises the steps of obtaining at least one path limit value along at least one axis in a simulated printing environment, positioning the virtual three dimensional model within the simulated printing environment, and indicating a failure when a part of the virtual three dimensional model is positioned beyond the at least one path limit value.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 6A and FIG. 6B are exemplary partial source code implementations of methods of the present invention;

DETAILED DESCRIPTION

Figure 1:
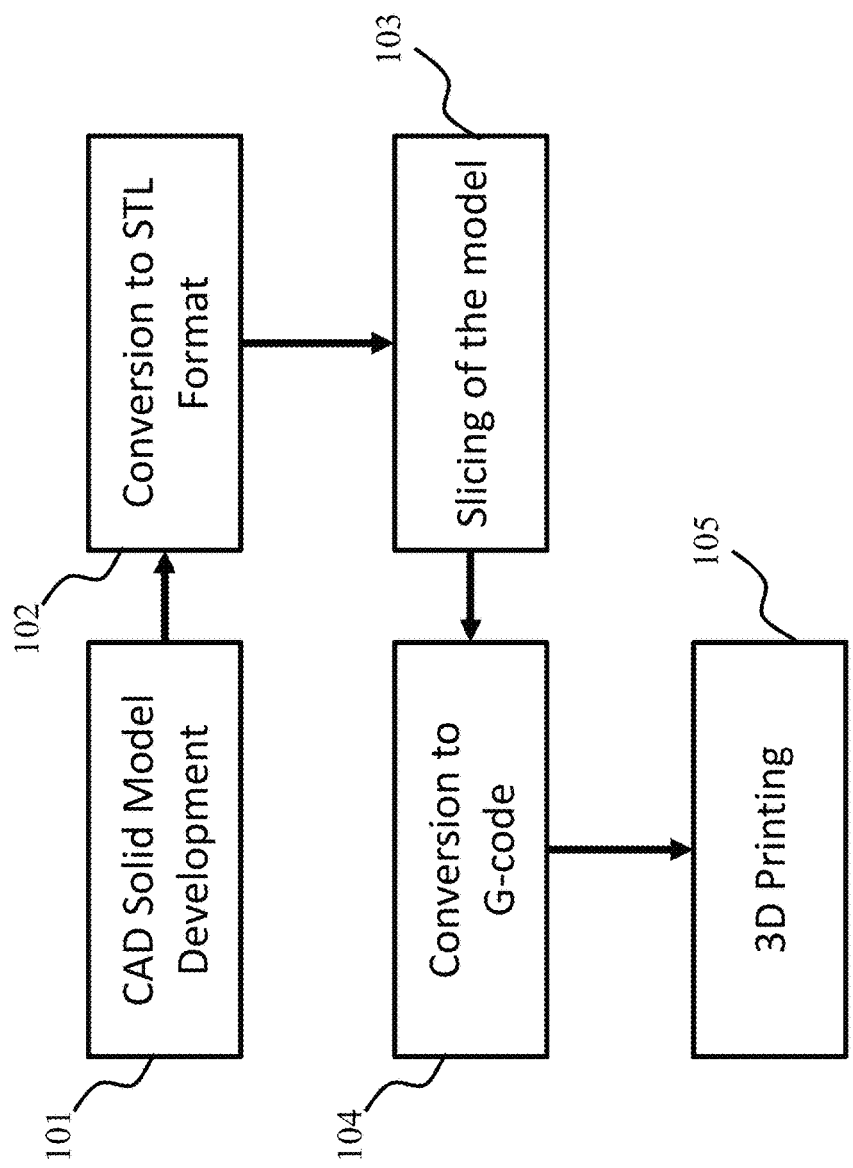
FIG. 1 is a simplified diagram of an exemplary additive manufacturing process.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of +20%, +10%, +5%, +1%, and +0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

The premise of 3D printing technology lies in its inherent potential to build artifacts with arbitrary internal features, rapidly and with relatively low cost. AM or 3D printing processes overcome the fundamental limitations of traditional (subtractive) methods, such as milling or turning, where material is selectively removed from solid blocks and the final geometry is subject to tool accessibility. Indeed, it is impossible to feature fully enclosed hollow spaces (e.g., a ship inside a bottle) using subtractive methods as tool access is blocked. At the same time, 3D printing machines operate by depositing materials in thin layers, which eventually allows constructing any complex geometry with significantly less material waste. Due to its numerous advantages, this disruptive technology is also considered by many as the next industrial revolution.

At the same time, there is no shortage of concerns about the security implications of 3D printing, especially when one leverages the decentralized nature of contemporary process chains and outsources manufacturing steps to potentially untrusted third parties. In this threat model, it is important to ensure the structural integrity of the 3D printed geometries against intentional and unintentional defects. Specifically, one goal of the present invention is to be able to detect any modification that has an adverse impact on the structural integrity of the printed artifact, especially when its load bearing capacity is weakened. As a motivational example, one may consider the original design of a solid rod that is modified to feature an internal (hidden) void; such a defect could decrease the rod's ability to bear loads and cause a premature failure.

It is important to note the difference between a three dimensional "model" and a "toolpath." A three dimensional model is a computer representation of an object that is easily viewed and manipulated by a designer, and may be represented by a point cloud; a set of extrusions, cuts, and rotations; or a set of two dimensional "views," or projections of the object onto a plane. A toolpath, by contrast, is a set of tool-control language (TCL) instructions that directs a 3D printer to print an object. Instructions may include changing nozzle direction or speed, changing material extrusion speed and temperature, changing nozzle temperature, changing print bed temperature, activating or deactivating a laser, depositing a quantity of powdered material, changing ultraviolet light intensity, or other instructions suitable for producing an AM part. Importantly, the conversion of a 3D model into a 3D toolpath is a lossy process, as exact dimensions are rounded to match the printer resolution. Though g-code is one example of a TCL disclosed herein, it is understood that systems and methods of the present invention are compatible with any TCL, including but not limited to g-code, m-code, or step-nc.

It is understood that the system and methods of the present invention may be used with any material suitable for use in additive manufacturing. These include, but are not limited to, polymers, including syntactic foam and ABS; metals, including aluminum, stainless steel, and titanium; minerals, including marble, granite, or quartz; tissue, including muscle tissue, bone, or cartilage; or other materials, including ceramics, composite materials, biopolymers, or cells.

A simplified AM process chain is illustrated in the flow diagram presented in FIG. 1. As shown, an exemplary AM process chain comprises step 101 of developing a CAD solid model, step 102 of converting the CAD file to a standard tessellation language (STL) or other suitable file, step 103 of slicing the model into one or more layers, step 104 of converting those layers into TCL instructions, and step 105 of printing the part. Although many file formats, including some specific to AM such as AMF, are available, STL is still the most widely used format. The STL file undergoes further conversion to generate 2D slices of the model, which are then converted to a TCL, for example, g-code. Additive manufacturing machines, sometimes called 3D printers, are capable of producing parts with a layer resolution from hundreds of microns thick to as small as 16 microns thick. Micro- and nano-fabrication methods, such as electron-beam lithography, photolithography, and two-photon polymerization may in some embodiments create 3-D structures with a resolution of 100 nm or lower, sometimes as low as 30 nm. Examples of such printers are described in Mao et al, ("The emerging frontiers and applications of high-resolution 3d printing." Micromachines, 2017. 8(4)), and Cumpston et al, ("Two-photon polymerization initiators for three-dimensional optical data storage and microfabrication." Nature, 1999. 398(6722)). Printers that are capable of printing at even higher resolution such as nanoprinting have also found applications in tissue engineering, electronics manufacturing, material synthesis/patterning, and drug delivery. These high value components and applications can be critical in terms of information privacy, intellectual property rights, and human life-threatening events, and are subjected to attacks from all sources, similar to Cyber-Physical Systems (CPS) attacks.

Figure 2:
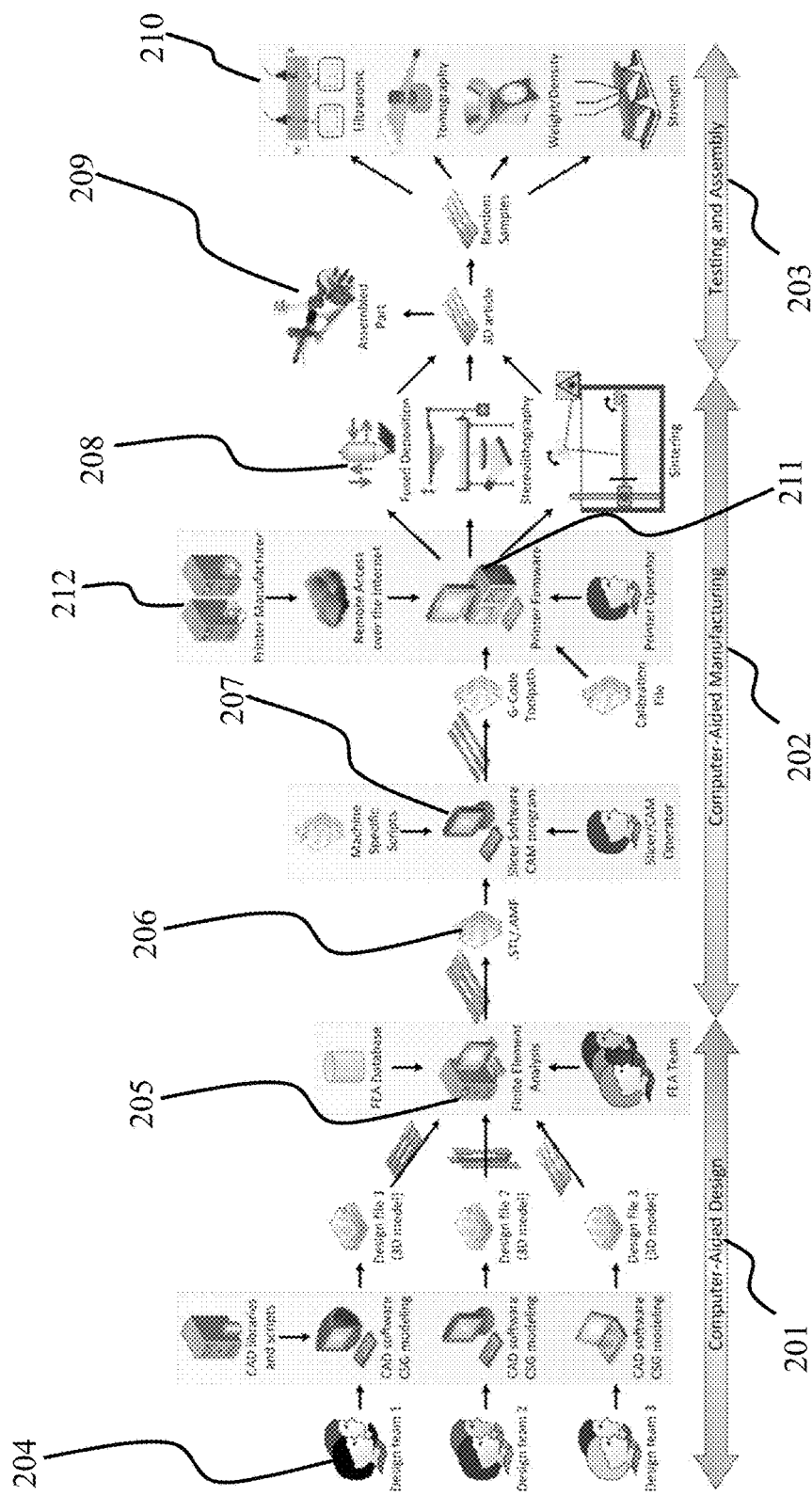
FIG. 2 is a diagram of an exemplary distributed and collaborative additive manufacturing process.

A more complex process chain is shown in FIG. 2. This more complex process demonstrates some of the problems and opportunities for malfeasance that can appear in modern, multi-user, multi-site AM processes. The process chain is divided into three phases: the computer-aided design phase 201, the computer-aided manufacturing phase 202, and the testing and assembly phase 203. The process begins with one or multiple design teams 204 each designing a part of the finished product. Each design team may comprise one or multiple designers, and each design team may produce one or multiple finished design files (3D models). In some embodiments, each design team develops the same part independently, and then the best design is selected for use based on the results of a simulated test. Simulated preliminary tests 205 may include for example Finite Element Analysis (FEA) tests performed by an FEA team, in order to predict whether parts produced from the provided 3D models meet required mechanical specifications. The FEA team may further test the design using a variety of simulated materials selected from one or more material databases, in order to determine via FEA the most appropriate material to use for the finished product.

As understood herein, an FEA test is a test which subjects 3D geometries to simulated load or stress conditions. FEAs can be implemented reasonably efficiently by specialized computer programs configured to solve systems of partial differential equations.

After the models have passed preliminary testing and are deemed satisfactory, the process chain enters the computer-aided manufacturing phase 202. Some or all of the models are converted to one or more STL files 206 using a CAM (computer-aided manufacturing) process. In some embodiments, only the best model is converted based on the results of the FEA. Because STL files encode only the surface geometry of the polyhedral approximation of the original 3D object, they are not suitable for FEA. The STL files are then sliced 207 in a slicing software, into the individual, thin layers that will be printed. The slicer converts the solid surface STL files into a toolpath expressed in a TCL, for example g-code, for use with a 3D printer. The g-code or other TCL file is then used by a printer 208 to print one or more printed parts, which can then be assembled to form the final assembly 209. The toolpath comprises a set of TCL instructions which direct the 3D printer on how to traverse each layer of the part being printed. The printer may use any 3D printing method known in the art, including, but not limited to, fused filament fabrication, stereolithography, inkjet printing, sintering, digital light processing, selective laser melting, electron beam melting, wire bending or deposition, and laminated object manufacturing. In some embodiments, parts are made using a combination of multiple printer types. The printer may be connected to and controlled by a dedicated computer that is configured to control the various actuators in the 3D printer and translate the TCL instructions into printer movements. In some embodiments, the printer may further include one or more sensors, calibrated to ensure dimensional accuracy. Alternatively, the printer may be remotely controlled by a network-connected controller, in order to enable remote management and assistance from the printer's manufacturer, or to allow for positioning the printer far away from the required computing capacity. Remote network connected controllers may be a single computer or microcontroller, or may alternatively be a cloud-based solution.

Once the parts are produced, the process chain enters the testing and assembly phase. Some of the printed parts are selected for random testing 210 in order to determine whether they meet the required mechanical specifications. For example, parts may be weighed to ensure that they were constructed in a way that guarantees an expected density. Tomography tests project radiation through parts, and may be used to visualize the internal structure of the printed part in high resolution to detect internal impurities, unexpected internal voids or internal features. Magnetic resonance imaging and millimeter wave technology can also be used for imaging. Ultrasonic tests may be used to detect impurities and defects along one or more axes. Parts may also be tested for strength, for example through a destructive stress test wherein a part is stressed along an axis until it breaks. Other types of appropriate tests include bending, fatigue, and torsion.

The weakness of the conventional process chain becomes apparent when one considers that in between the preliminary tests 206 and the final tests 210, the 3D model has undergone two digital conversions (first to STL, then to a toolpath) and a physical conversion when the toolpath is printed. If the slicer software 207, the printer firmware 211, or the printer manufacturer systems 212 were to be compromised, structural deficiencies could be introduced into the final printed part, with no way to detect them until after the part had already been printed.

During the CAD phase 201 of the process, a malicious insider may corrupt the 3D model or introduce structural defects directly, so that the physical object would fail prematurely or under lower stress levels. An adversary may launch such an attack, for example, by exploiting the underlying CAD software, 3D model databases, and scripts used by the designer. Alternatively, an adversary may attack the FEA software 205 to report false design problems (e.g., nominate the least suitable design), or to poison the FEA database to falsify material properties (e.g., indicate that the 3D object is metal when it is actually plastic).

Moving forward to the CAM phase 202 of the process, the original 3D source is compiled into polyhedral abstractions, for example in an STL file. An adversary could modify the surface information, for example by removing polyhedrons, to introduce voids at critical points in the structure. Similarly, by adding malicious protrusions or making dimension transformations/scale changes, an adversary may directly impact the elasticity and load-bearing capacity of the object. When the STL file is sliced into TCL instructions (e.g., g-code), maliciously modified slicer software may be used to degrade specific printing parameters, such as the skin/core porosity, the head speed and acceleration, the nozzle and print chamber (curing) temperature, as well as the extrusion speed. Likewise, an adversary may corrupt the firmware of the 3D printer itself to modify how TCL instructions are interpreted by the printer actuators, falsify sensor values, or inject additional commands to the print stack.

Figure 3:
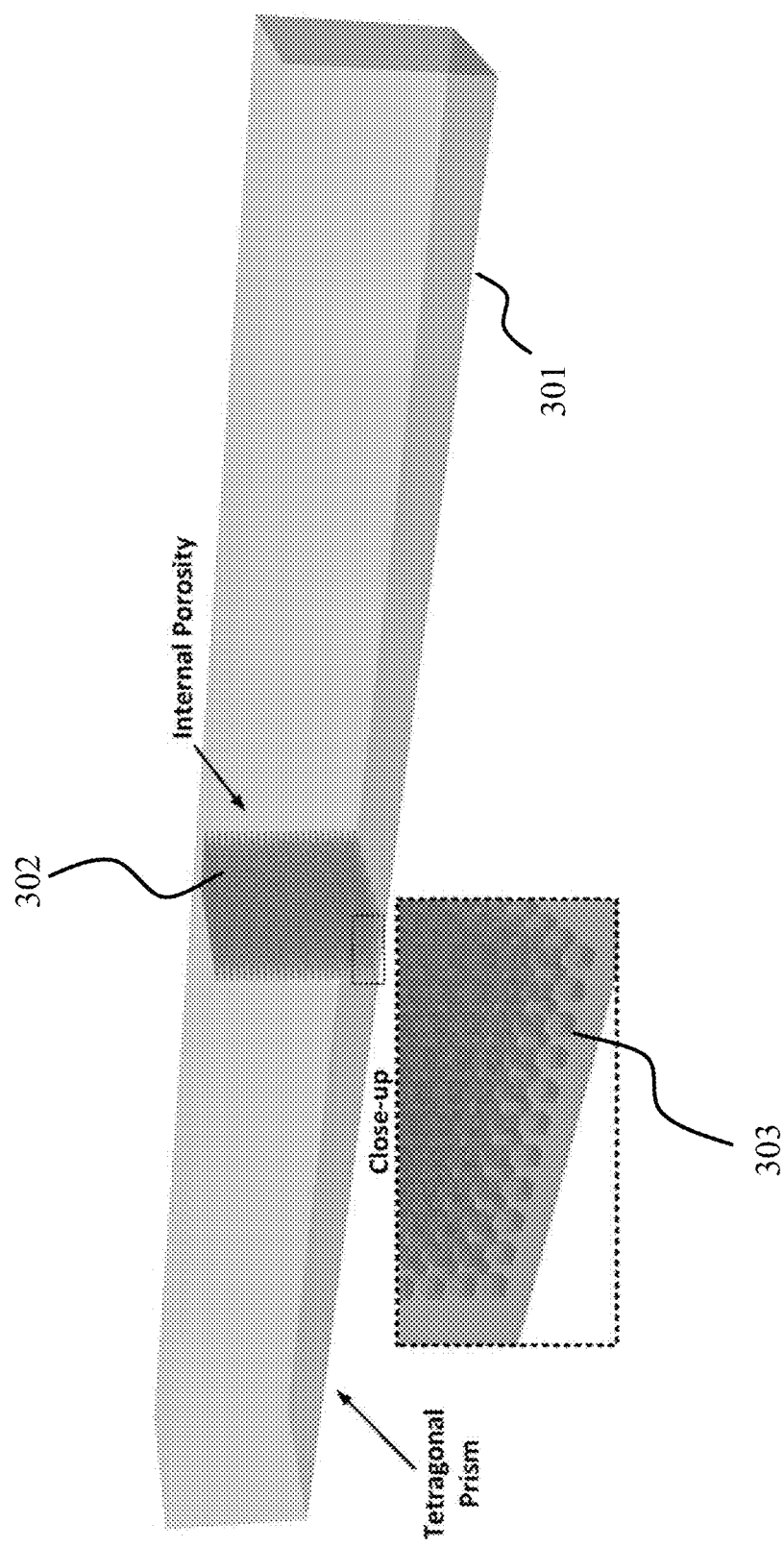
FIG. 3 is an exemplary three dimensional model of an additive manufactured part with internal porosity.
Figure 4:
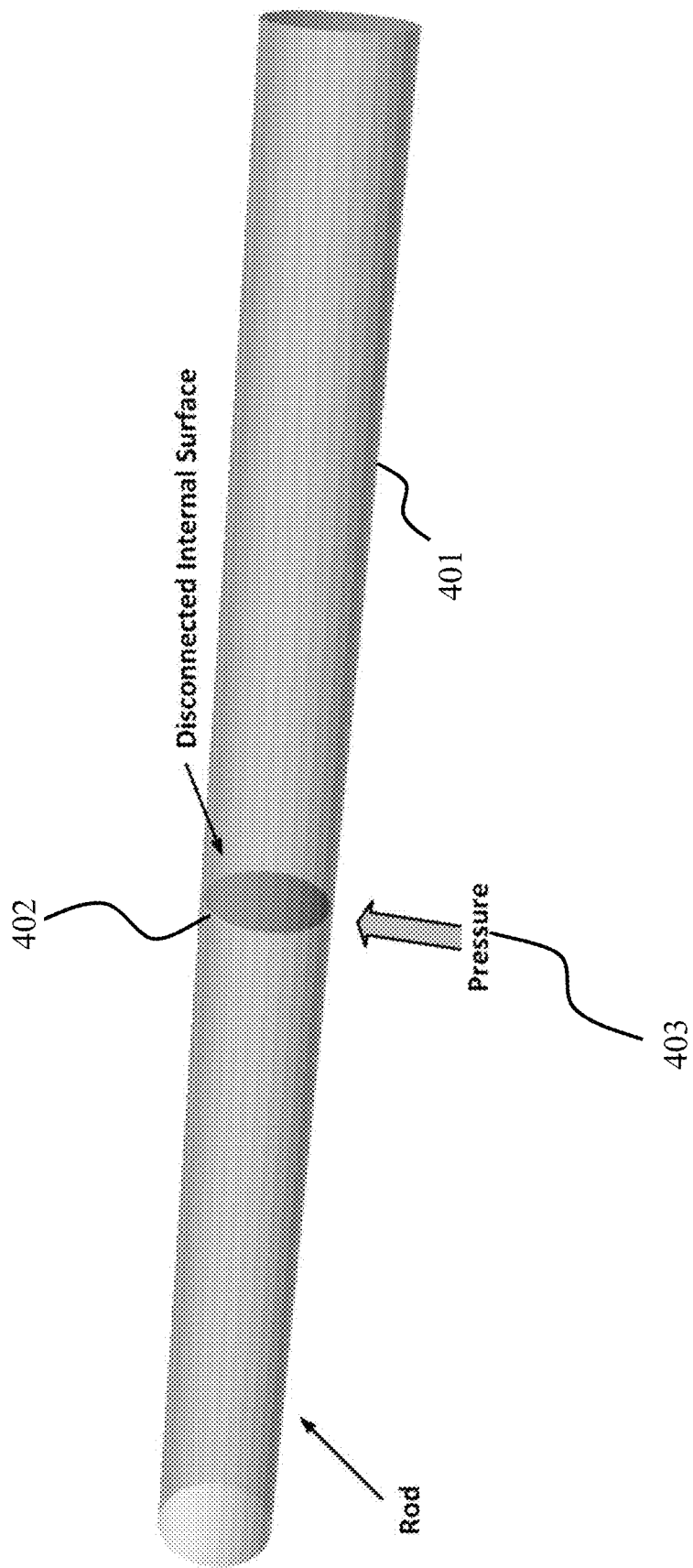
FIG. 4 is an exemplary three dimensional model of an additive manufactured part with a disconnected internal surface.

Examples of potential printing defects are shown in FIG. 3 and FIG. 4. With reference to FIG. 3, a tetragonal prism 301 is initially designed as a solid block of material, but through malicious modification of the computer-aided design file or printer parameters, a region 302 of internal porosity has been introduced, comprising a set of voids 303. For example, in a sintering printer, such a set of voids could be introduced by disabling the laser signal to leave unmelted material in the generated voids 303. In this way, the overall density and weight of the object would remain unchanged. The presence and distribution of the voids 303 results in a finished prism 301 which by outward appearances is solid, but in reality has a hidden weakness at the region 302 and thus could break under pressure.

Another example is shown in FIG. 4. Here, the printed part is a rod 401, also designed as a single solid piece. Though malicious modification of the computer-aided design file or printer parameters, a hidden void 402 has been added to create a disconnected internal surface in the middle of the rod. Because the rod is now essentially two rods connected by a thin "skin" of material surrounding the internal void, the mechanical integrity of the rod 401 is compromised, and it will break easily if perpendicular pressure 403 is applied at the void. Here, the overall size of the void is very small compared to the size of the part, so the relative change in weight and density is minimal.

Other examples of potential defects include reducing structural integrity by altering toolpath orientation (for example by reversing X and Y coordinates), increasing the speed of the print head, skipping layers, reducing the curing temperature, and changing the print material density. Additionally, an adversary might replace the base print material with support material in a printer that has multiple material sources and nozzles. Such support material is primarily intended to hold printed layers in place in the presence of gravity, and typically has worse structural qualities than the base print material. Finally, an adversary might cause the printer to exceed the X-Y path limits, or force the nozzle into the object on the print bed. Such attacks can result in wasted time and material, or may cause damage to the printer itself.

The 3D printing process is also vulnerable during the testing step, where an adversary may try to tamper with the test results. In tomography or ultrasonic scan tests, a potential threat may be the reduction of scan resolution, which effectively hides minute defects (such as porosity) introduced in the CAD or CAM steps. Likewise, an adversary may falsify the test results directly (causing defective objects to pass the tests), or tamper with the testing parameters to decrease the actual yield rates and cause legitimate 3D objects to be discarded as faulty. In the former case, accepting faulty objects may cause indirect financial impact due to expensive recalls afterwards, while the latter case causes direct financial impact due to legitimate objects being discarded. Similarly, in case "physical hash digests" are used (such as weight/density tests), attackers could easily falsify the expected measurements by finding weight/volume collisions between the original and the modified object, masquerading faulty artifacts as legitimate. For example, by displacing material from a critical region to another area, the weight/density measurements would remain the same while the strength of the object could be weakened.

Figure 5:
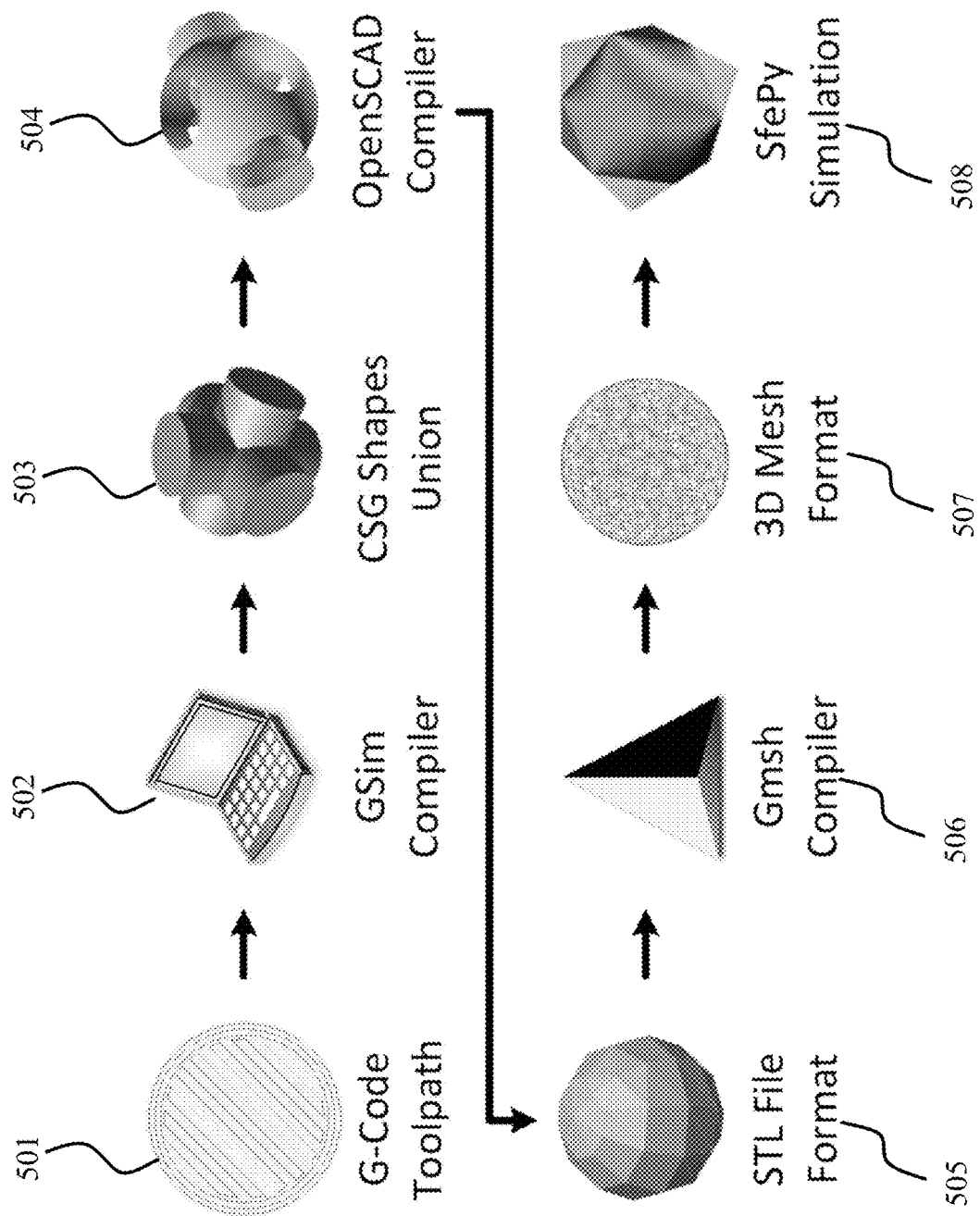
FIG. 5 is a diagram of a simplified process flow of the present invention.

Methods of the present invention relate to reverse-engineering TCL instructions to reconstruct a valid pre-image that would closely approximate the part created when printing using the TCL instructions. The pre-image is then transformed to a 3D mesh and simulated under stress conditions using FEA or another type of numerical analysis to determine structural integrity. Examples of suitable simulated analyses include, but are not limited to, a fluid dynamics analysis, a discrete element method analysis, a tensile analysis, or a thermal conductivity analysis. A diagram of one embodiment of a method of the present invention is shown in FIG. 5. First, a set of TCL instructions 501 is fed into a novel compiler of the present invention 502, referred to interchangeably herein as GSim. GSim parses each TCL instruction and generates a corresponding set of constructive solid geometry (CSG) instructions. For each TCL instruction, the compiler identifies the material added to the current layer in 3D space and outputs the CSG union of basic solid shapes at the corresponding orientation and coordinates. Examples of suitable basic solid shapes include, but are not limited to, prisms, cylinders, cuboids, pyramids, spheres, or cones. These solid shapes can also be envisioned for example as interconnected filament sections of a virtual FFF printer, floating in three dimensional space based on the X, Y and Z coordinates of the toolpath.

The CSG code 503 is rendered to a solid 3D object using a compatible solid geometry compiler 504, for example OpenSCAD, and then saved as an STL file 505. This reconstructed STL file describes substantially the same polyhedral approximation as the original STL file (i.e., the one generated by the original designer). The reconstructed STL file 505 is then converted to a 3D mesh 507 with a suitable converter 506, for example Gmsh, which fills the closed surface represented by the STL input. The generated 3D mesh is now compatible with FEA tools 508, for example the SfePy FEA toolchain.

In order to better simulate the features of a produced 3D printed part from a set of TCL instructions, methods of the present invention may further assign different material values to the basic solid shapes depending on certain TCL instructions. For example, in a laser sintering application, a method of the present invention may assign a basic solid shape one material value when a sintering laser is turned on, but another value when the sintering laser is turned off. Similarly, in a fused material extruding application, different material values may be assigned based on the extrusion nozzle speed or temperature. Differing material values allow for more accurate simulation of structural problems that may be introduced by not allowing AM material to melt properly in certain regions of an AM part.

Methods of the present invention may further be used to ensure that a candidate toolpath actually fits within the geometric limits of a printer. A toolpath may be maliciously altered to swap axes or increase magnification. Such changes can cause damage to the printer itself, or waste time and material by producing a part that has missing regions or is the wrong size.

The 3D mesh is simulated under different loading conditions, where loads can be mechanical, electrical, thermal, magnetic, or any combination of these. Simulation tests may include, but are not limited to, linear elasticity tests, tensile strength tests, as well as thermal and electrical conductivity tests. Simulations may be based on numerical methods including, but not limited to, finite element analysis, computational fluid dynamics analysis, and extended discrete element method analysis. In some embodiments, the simulation result is returned as a color coded image illustrating any overstressed areas. In case such areas are identified under nominal stress conditions, the toolpath provided in the first step is problematic, as it would manufacture an object with inadequate stress tolerance. Conversely, if the simulation, for example an FEA, does not highlight any problematic areas, this provides assurance that the toolpath to be printed is problem-free. Notably, this exemplary method of the present invention uses simulations and does not require a golden model, since only the material parameters and force specifications are required to simulate an object under stress conditions.

The reconstruction and validation method of the present invention is advantageous for reasons including but not limited to cost and speed. The disclosed reconstruction method incurs negligible cost, compared with the cost of printing an actual 3D object and testing the 3D object for structural defects. Any deficiencies in the toolpath will manifest in the virtual representation of the printed object, and detected by simulated testing prior to incurring the costs of printing. The disclosed reconstruction method also is able to perform simulated printing and testing within a time frame of seconds to minutes, significantly faster than the hours taken to print and test a physical part.

Referring now to FIG. 6A and FIG. 6B, exemplary source code is shown implementing conversion steps of the present invention. FIG. 6A depicts an exemplary function for converting an arc instruction (G2 and G3 g-code operations) into a set of interconnecting cubes, along an arc centered at coordinates ($x_{cnt}$, $y_{cnt}$), having radius rad, and sweeping out an angle $d_{end}$. The function simulates at a rough granularity what a 3D printer would do in response to an arc instruction. FIG. 6B depicts a corresponding conversion function for a straight line filament deposit from coordinates ($x_0$, $y_0$, $z_0$) to coordinates (x,y,z). The functions shown in FIGS. 6A and 6B are presented as examples only, and are not meant to be limiting to the invention. The depicted functions merely present one exemplary embodiment of a method of the invention, directed toward converting the g-code instructions that drive a 3D printer into a three dimensional virtual approximation of the part that would be printed by a 3D printer following those g-code instructions.

With reference to Table 1 below, a list of g-code and m-code operations and a brief description of each is shown. In embodiments of the invention that interpret g-code and m-code, the list of operations that may be interpreted by functions of the invention include, but are not limited to, the operations shown in Table 1. In some embodiments, functions of the invention may interpret all g-code and m-code operations. In other embodiments, functions of the invention may interpret all operations of an alternative TCL.

TABLE 1

| Operation(s) | Description |
| --- | --- |
| G0, G1 | Linear Movement |
| G2, G3 | Arc Movement |
| G20, G21 | Inches/Millimeters |
| G28 | Return to Origin |
| G90, G91 | Absolute/Relative Position |
| G92 | Reset Current Position |
| M73 | Report Build Percentage |
| M82, M83 | Absolute/Relative Extruder Position |
| M84 | Disable Motors |
| M101, M103 | Enable/Disable Extruder |
| M104, M109 | Set Extruder Temperature |
| M106, M107 | Enable/Disable the Fan |

Figure 7:
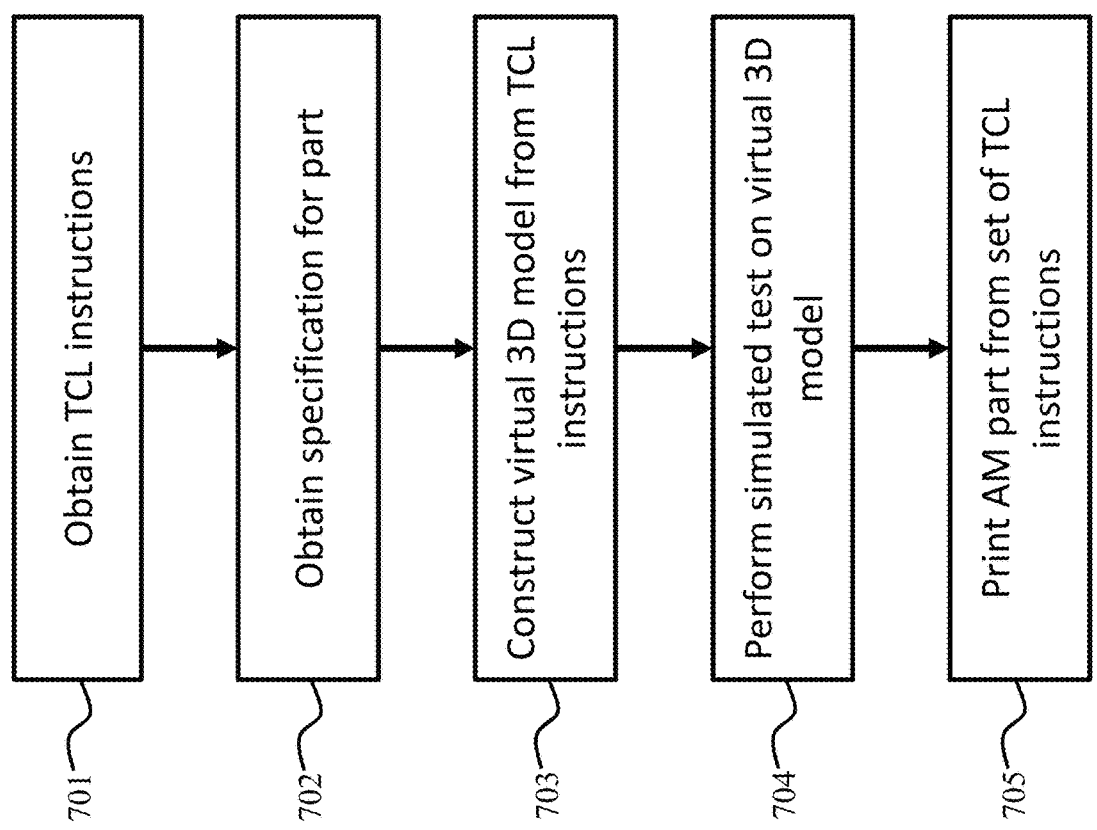
FIG. 7 is a diagram of a method of the present invention.

With reference to FIG. 7, a method of the present invention is shown. As depicted, a method of producing an additive manufactured part begins with step 701, obtaining a set of TCL instructions that define an additive manufactured part, and step 702, obtaining a mechanical, electrical, thermal, and/or magnetic specification for the additive manufactured part. In step 703, a virtual three dimensional model is constructed from the set of TCL instructions. The virtual three dimensional model is then subjected to simulated mechanical, electrical, thermal, and/or magnetic simulation tests in step 704, comprising at least one analysis step, to determine whether the virtual three dimensional model meets the first mechanical, electrical, thermal, and/or magnetic specification. Finally, if the virtual three dimensional model passes the simulated test, an additive manufactured part is printed in step 705 from the set of TCL instructions.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples therefore, specifically point out exemplary embodiments of the present invention, and are not to be construed as limiting in any way the remainder of the disclosure.

To evaluate our reconstruction and validation methodology, a tetrahedral prism was used as a case study. Due to its geometric simplicity and orthogonal dimensions, a tetrahedral prism offers several benefits over alternative geometries (such as a cylinder or a sphere for example), since it allows precise alignment of the prism's edges with the generated g-code toolpath. The latter effectively minimizes the information lost during the lossy slicing step (i.e., before the framework is engaged), which is beneficial for evaluation purposes to illustrate the accuracy of the reconstruction method itself.

To generate the g-code toolpath for a tetrahedral prism object, which will be used as input to the framework, an original 3D source was created using CSG and OpenSCAD. This 3D source corresponds to the CAD step 201 in FIG. 2. Though OpenSCAD was used in this example, any 3D design software could have been used without loss of generality. It is also important to note that the use of CSG and OpenSCAD should not be confused with the reconstruction framework that leverages the same tools for a different purpose. To generate g-code, the 3D design was first translated into an STL file using OpenSCAD, then sliced using the Slic3r software. This g-code would normally be sent to a 3D printer to manufacture the corresponding 3D object, but in this example, it is sent directly to a framework of the present invention for reconstruction and validation.

Figure 8:
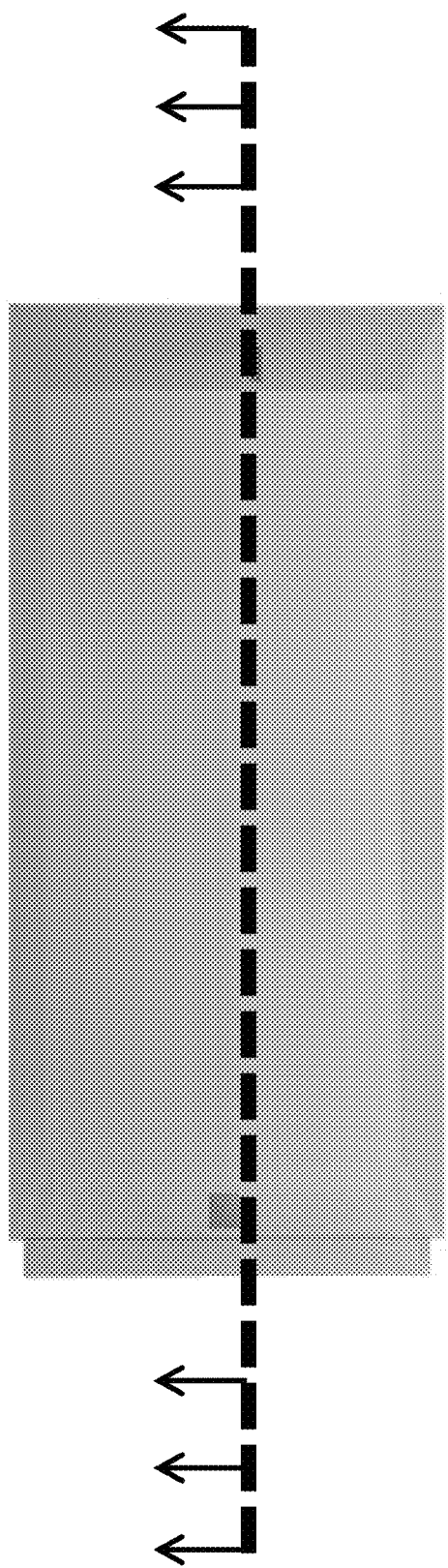
FIG. 8 is an exemplary finite element analysis result.

The reconstruction result for the non-defective tetrahedral prism is presented in FIG. 8, where no impurities are identified as expected. Following the steps described herein and summarized in FIG. 5, the input g-code was compiled to CSG using GSim, before being compiled to STL by OpenSCAD. The STL file was converted to 3D mesh format using Gmsh and then simulated by SfePy. A linear elasticity test was used for the FEA, which simulated a displacement of 0.01 units applied only on the positive half of the X axis (while the negative half remained fixed), assuming a linear elastic material with $\lambda=10$ and $\mu=1$ Lame constants. If the exact material used by the 3D printer is known, alternative Lame constants can be used in the simulation. Likewise, depending on the strength tolerance specifications of the object, different displacement values may be applied at different regions of the object.

To compare against the non-defective SfePy simulation output, the previous experiment was repeated using a defective tetrahedral prism. The latter was also constructed in OpenSCAD using CSG, but this time small voids were introduced into the prism geometry using subtractive CSG commands. As before, the defective 3D source was converted to STL and then sliced to a g-code toolpath. Such defective or maliciously-altered g-code is what frameworks of the present invention are designed to detect, acting as anti-malware for the 3D printer.

Figure 9:
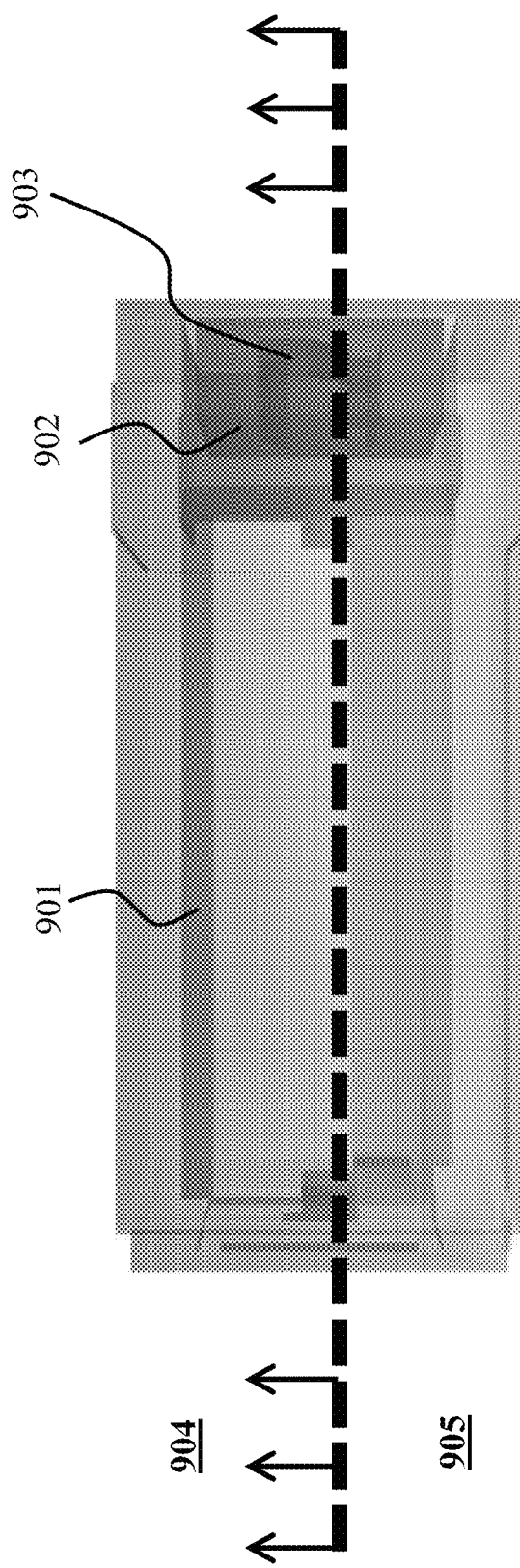
FIG. 9 is an exemplary finite element analysis result showing mechanical deficiencies.

After invoking the reconstruction and validation framework on the g-code of the defective prism, a new SfePy simulation was performed, which showed multiple defects, as depicted in FIG. 9. The simulation indicates multiple foci of stress 902 and 903 around the right side of the prism, which in turn indicates the existence of voids and impurities. At the same time, a less prominent impurity 901 is visible across the long axis of the prism. The unexpected stress to the prism under displacement conditions on the positive half 904 of the X axis is illustrated with more intense, non-gradual, red colored areas. The negative half 905 of the X axis, which is not displaced in the simulation, remains (mostly) green.

The above experimental example shows the effectiveness of the disclosed methodology in identifying defects in TCL instructions of 3D objects without the use of a golden model. Using numerical method simulations along with knowledge of the specifications and material parameters of the 3D printed object, including but not limited to stress tolerance, mechanical, thermal, magnetic, and/or electrical properties, methods of the present invention can validate if the input TCL meets specific requirements without having to actually print and test a physical artifact.

What is claimed is:

1. A method of producing an additive manufactured part, comprising the steps of:
   obtaining a set of tool-control language instructions that define the additive manufactured part;
   obtaining a first mechanical specification for the additive manufactured part;
   constructing a virtual three dimensional model from the set of tool-control language instructions by performing steps comprising:
      generating a set of basic solid shapes;
      compiling geometric transformations on a set of basic solid shapes into transformed solid shapes;
      compiling a union of a first subset of transformed solid shapes into a first compound solid shape;
      compiling the first compound solid shape into at least one solid geometry;
      converting the at least one solid geometry into a three dimensional mesh;
      creating a virtual three dimensional model from the three dimensional mesh;
      compiling an intersection of a second subset of transformed solid shapes into a second compound solid shape;
      compiling a difference of a third subset of transformed solid shapes into a third compound solid shape;
      compiling a union, intersection, and/or difference of a subset of compound solid shapes into a fourth compound solid shape;
      compiling a union of a subset of compound solid shapes into the at least one solid geometry;
      converting the at least one solid geometry into the three dimensional mesh; and
      creating the virtual three dimensional model from the three dimensional mesh;
   performing at least one analysis step on the virtual three dimensional model to determine whether the virtual three dimensional model meets the first mechanical specification; and
   printing an additive manufactured part from the set of tool-control language instructions when the virtual three dimensional model meets the first mechanical specification.

2. The system of claim 1, wherein the set of tool-control language instructions comprises statements or instructions selected from the group consisting of g-code, m-code, and step-nc.

3. The method of claim 1, wherein the at least one analysis step is compatible with a numerical method for solving partial differential equations, wherein the numerical method is selected from the group consisting of a finite element analysis, a computational fluid dynamics analysis, and an extended discrete element method analysis.

4. The method of claim 1, wherein the additive manufactured part is printed from a material selected from the group consisting of a polymer, a metal, a ceramic, and a composite material.

5. The method of claim 1, further comprising the steps of:
   compiling a set of geometric transformations on a set of basic solid shapes into a set of transformed solid shapes;
   compiling a union of a first subset of transformed solid shapes into a first compound solid shape;
   compiling an intersection of a second subset of transformed solid shapes into a second compound solid shape;
   compiling a difference of a third subset of transformed solid shapes into a third compound solid shape; and
   compiling a union of a subset of transformed solid shapes into at least one solid geometry.

6. The method of claim 1, wherein the basic solid shapes are selected from the group consisting of prisms, cylinders, cuboids, pyramids, spheres, and cones.

7. The method of claim 1, further comprising the steps of:
   assigning a first material value to a basic solid shape when a sintering laser is enabled; and
   assigning a second material value to the basic solid shape when the sintering laser is disabled.

8. The method of claim 1, further comprising the steps of:
   assigning a first material value to a basic solid shape when a fused material extruder is enabled; and
   assigning a second material value to the basic solid shape when the fused material extruder is disabled.

9. The method of claim 1, further comprising the steps of:
   assigning a first material value to a basic solid shape if a nozzle temperature setting exceeds a threshold; and
   assigning a second material value to a basic solid shape when the nozzle temperature setting is below the threshold.

10. The method of claim 1, further comprising the steps of:
    assigning at least one material stiffness parameter based on an intended composition of the additive manufactured part; and
    assigning at least one displacement value based on an intended functionality of the additive manufactured part.

11. The method of claim 1, further comprising the steps of:
    obtaining at least one path limit value along at least one axis in a simulated printing environment;

positioning the virtual three dimensional model within the simulated printing environment; and indicating a failure when a part of the virtual three dimensional model is positioned beyond the at least one path limit value.

* * * * *